May 14, 1968 W. W. HEINZ ET AL 3,382,889
SEALING MEANS
Filed Aug. 30, 1965
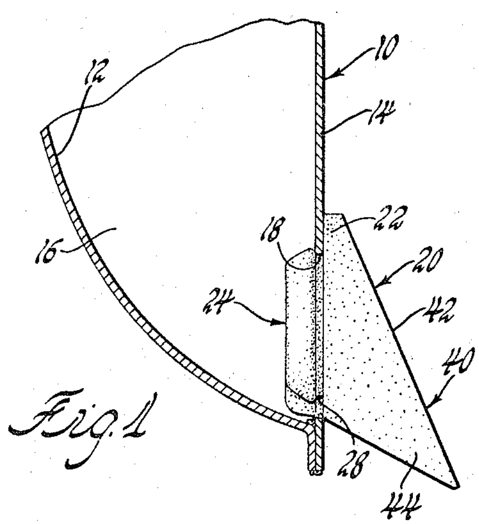
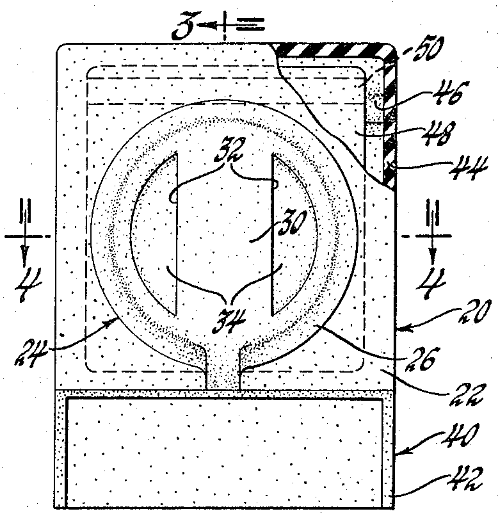
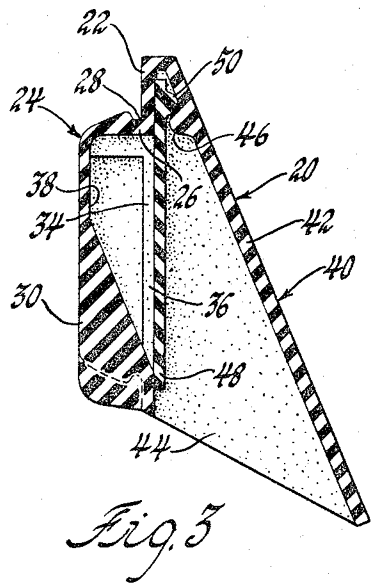
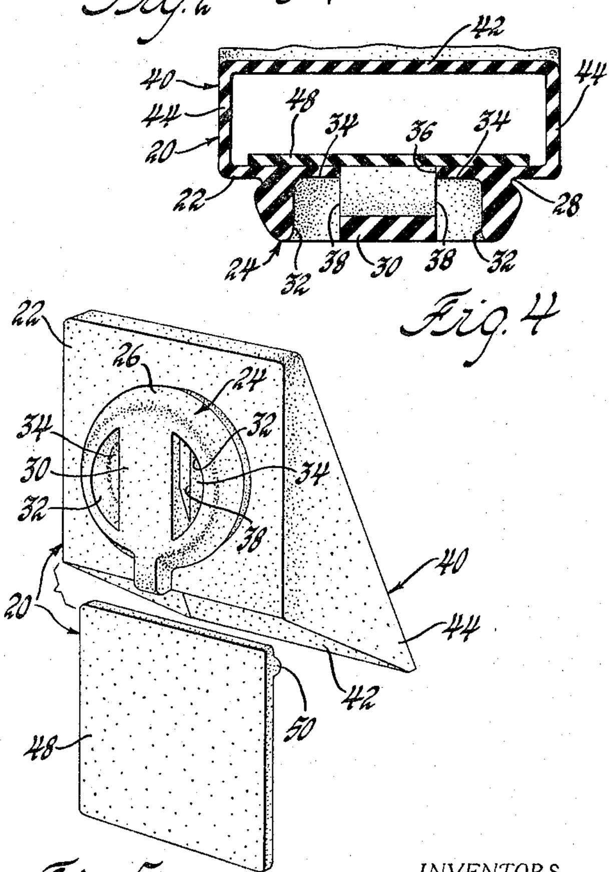
INVENTORS
Walter W. Heinz &
Nicholas A. Schneider
Herbert Furman
ATTORNEY 3,382,889

SEALING MEANS

Walter W. Heinz, Utica, and Nicholas A. Schneider, Detroit, Mich., assignors to General Motors Corporation, Detroit, Mich., a corporation of Delaware Filed Aug. 30, 1965, Ser. No. 483,426
4 Claims. (Cl. 137—525.3)

ABSTRACT OF THE DISCLOSURE

A vehicle body drain valve includes a body portion seating against one surface of a body panel and an annular undercut rib projecting through an opening in the panel to the other side thereof to mount the body portion on the panel. One end of the mounting portion is traversed by a central web and the other end of the mounting portion is traversed by chordal webs. A flap valve includes a rib interengaged with a rib on an integral shield of the body portion and covers the other end of the annular mounting portion.

This invention relates to sealing means for vehicle bodies and more particularly to improved sealing means for sealing drain openings of vehicle bodies.

Drain openings are usually provided in drain troughs in hollow body areas, such as between body outer panels and various body inner panels. It is well known to provide sealing means to seal the openings against the entrance of ambient material but permit water collecting in the drain troughs to be drained outwardly through the openings.

One feature of this invention is that it provides an improved sealing means for vehicle body drain openings. Another feature is that the sealing means includes integral mounting means which cooperate with the opening in the body panel to mount the sealing means thereon. A further feature is that the sealing means includes a releasably mounted flap valve. Yet another feature of this invention is that a shield portion is provided to cover the flap valve and aid in mounting the flap valve on the sealing means.

Yet a further feature is that the mounting portion is of generally annular shape and web means are provided at one end thereof which close a portion of the opening at the one end and web means are provided at the other end thereof for closing the portions of the opening at the other end which are aligned with the unclosed portions at the one end.

These and other features of the invention will be readily apparent from the following specification and drawings wherein:

FIGURE 1 is a partial view of a vehicle body having sealing means according to the invention mounted thereon;

FIGURE 2 is an enlarged partially broken away view of the sealing means;

FIGURE 3 is a sectional view taken generally along the plane indicated by line 3—3 of FIGURE 2;

FIGURE 4 is a sectional view taken generally along the plane indicated by line 4—4 of FIGURE 2; and FIGURE 5 is an exploded perspective view.

Referring now to the drawings, a vehicle body designated generally 10 includes outer and inner body panels 12 and 14 respectively which together define a well 16. The upper edges of the panels 12 and 14 are spaced apart and, therefore, water can enter and accumulate within the well 16. One or more drain openings 18 are provided in the panel 14 adjacent the pinchweld joining the panels together to drain any water which accumulates within the well. Sealing means 20 according to this invention are mounted within the opening 18 to permit the water to drain through the opening to the exterior of the body and yet prevent ambient material such as mud from entering the well through the drain opening.

Referring now particularly to FIGURES 2 through 5 of the drawings, the sealing means 20 includes a body portion 22 which bears against the outer surface of the body panel 14 around the opening 18. A mounting head or portion 24 is formed integrally with the body portion 22. The annular wall 26 of portion 24 is provided with an undercut portion 28 so that the mounting portion can be forced within the opening 18 until the edge of the panel 14 defining this opening snaps within the undercut portion 28 to mount the sealing means on the body.

A partially tapered integral central web 30 extends across the opening of the inner end of the mounting portion and cooperates with the inner end of the mounting portion in providing two semi-circular shaped openings 32 to each side thereof. The outer end of the opening of the mounting portion is provided with two semi-circular shaped integral webs 34 which are generally aligned with the openings 32 and define therebetween a slot or opening 36 which is generally aligned with the web 30. The axially spaced webs 30 and 34 thus define a tortuous or constricted path through the mounting portion 24 and the adjacent axially spaced free edges thereof define spaced vertical slots 38.

A shield portion designated generally 40 is formed integrally with the body portion 22. The shield portion includes a wall 42 which extends angularly from the upper edge of the body portion and is joined to the side edges of the body portion by walls 44. It will be noted that the wall 42 of the shield portion is provided with a rib or bead 46 adjacent the upper edge thereof and that of the body portion 22.

A flap valve 48 is provided to cover the entire outer end of the opening of the mounting portion 24 and to particularly cover the slot 36 defined between the webs 34. The upper end of the flap valve is provided with a rib or bead 50 which extends opposite of the bead 46 and is intended to be snapped over and behind the bead 46 as shown in FIGURE 3 to releasably mount the flap valve on the body portion 22.

The sealing means 20 seals the opening 18 when the vehicle is in motion. It is well known that a slight vacuum is created with the interior of a vehicle when in motion and thus well 16 would be under a slight vacuum so that flap valve 48 would seat against the outer surface of the body portion 22 and over the opening 36 to prevent dust and dirt and other ambient matter from entering the well. When the car is at rest, any water accumulated within the well 16 will move the flap valve 48 slightly away from the outer surface of the body portion 22 so as to drain outwardly of the body.

Since the flap valve is subject to flexing and is also subject to deterioration due to accumulation of mud and dirt, the provision of the releasable mounting means allows this valve to be easily removed for cleaning if such is necessary. If the valve need be replaced, this can also be easily accomplished.

Thus, this invention provides an improved sealing means for vehicle bodies.

What is claimed is:

1. In combination with a vehicle body panel having a drain opening therein, sealing means for said opening comprising, a body portion adapted to seat against said panel adjacent said opening and provided with an annular mounting portion projecting to the other side of the said panel through said opening, said mounting portion including an undercut head adapted to releasably engage said panel adjacent the opening therein to retain said body portion in place, an elongated web extending centrally across the inner end of the opening of said mounting portion, a pair of spaced semi-circular shaped webs extending across the outer end of said mounting portion opening in axially spaced relationship to said central web and in general alignment with the uncovered semi-circular shaped portions at said one end of said mounting portion opening, a shield formed integral with said body portion and including a wall extending angularly to said body portion from the upper edge thereof, a rib formed integrally with said wall adjacent the upper edge thereof, a flap valve for covering the outer end of said mounting portion opening and including an integral rib releasably engageable behind said angular wall rib to mount said flap valve in place for movement relative to the outer end of said mounting portion opening, and side walls connecting said angular wall to said body portion and cooperating with the body portion to provide a shield for said flap valve.

2. In combination with a vehicle body panel having a drain opening therein, sealing means for said opening comprising, a body portion having an annular mounting portion formed integrally therewith and secured within said drain opening, an integral shield on said body portion provided with a rib located to one side of said mounting portion, a flap valve for covering one end of said opening, and a rib on said flap valve interengaged with said shield rib to mount said flap valve on said body portion.

3. The structure recited in claim 1 wherein said first means includes a web extending centrally across said one end of said annular mounting portion and said second means includes integral semi-circular shaped webs exteding across said other end of said annular mounting portion.

4. In combination with a vehicle body panel having a drain opening therein, sealing means for said opening comprising, a body portion having an annular mounting portion formed integrally therewith and secured within said drain opening, means extending across one end of said annular mounting portion to close a portion of the opening at said one end, means in spaced relationship to said first means and extending across the other end of said annular mounting portion to close the portions of the opening at said other end in alignment with the unclosed portions of said opening at the one end thereof, a flap valve covering the annular mounting portion, and cooperating means on the valve and on the body portion secured to each other to mount the valve on the body portion in covering relationship to the annular mounting portion.

References Cited

UNITED STATES PATENTS

| | | | |
|---|---|---|---|
| 2,747,922 | 5/1956 | Gibson | 137—525.3 XR |
| 3,011,468 | 12/1961 | O'Gara | 137—525.3 XR |
| 3,158,176 | 11/1964 | Koland | 137—525 |

FOREIGN PATENTS 563,086 12/1942 England.

WILLIAM F. O'DEA, *Primary Examiner.*

W. H. WRIGHT, *Assistant Examiner.*